United States Patent [19]

Segawa et al.

[11] 4,398,282
[45] Aug. 9, 1983

[54] CAPACITANCE DETECTION TYPE STYLUS FOR GROOVELESS DISC RECORDS AND METHOD FOR MAKING SAME

[75] Inventors: Keiji Segawa; Norio Matsuda; Masaki Murakami, all of Yokohama, Japan

[73] Assignee: Victor Company of Japan, Limited, Yokohama, Japan

[21] Appl. No.: 261,793

[22] Filed: May 8, 1981

[30] Foreign Application Priority Data

May 10, 1980 [JP] Japan ................................ 55-61903

[51] Int. Cl.³ .......................... G11B 3/46; G11B 9/06
[52] U.S. Cl. .................................. 369/126; 369/173; 369/151; 29/25.42; 51/281 R; 51/326
[58] Field of Search ............... 369/170, 171, 172, 173, 369/126, 151; 51/281 R, 323, 326, 327; 29/25.42

[56] References Cited

U.S. PATENT DOCUMENTS

| 2,315,358 | 2/1982 | Hedel | 29/25.42 |
| 3,826,877 | 7/1974 | Leedom et al. | 369/126 |
| 4,098,030 | 7/1978 | Fuhrer et al. | 369/173 |
| 4,165,560 | 8/1979 | Matsumoto | 369/173 |
| 4,273,967 | 6/1981 | Wada et al. | 369/221 |

FOREIGN PATENT DOCUMENTS

| 55-135342 | 10/1980 | Japan | 369/126 |
| 197805 | 5/1978 | Netherlands | 369/173 |
| 2070312 | 9/1981 | United Kingdom | 369/173 |

Primary Examiner—Steven L. Stephan
Attorney, Agent, or Firm—Lowe, King, Price & Becker

[57] ABSTRACT

A cylindrical diamond body is shaped to form a truncated conical portion. A conductive layer is deposited on the diamond body extending from the truncated end to the other end of the body. The conical portion of the body with the conductive layer being attached thereto is lapped to remove portions of the layer and the diamond body to form a pair of substantially flat surfaces extending from the truncated end toward the opposite end leaving the conductive layer to form a narrow width electrode for picking just one information signal stored in the form of minute pits along a spiral track or concentric tracks.

12 Claims, 4 Drawing Figures

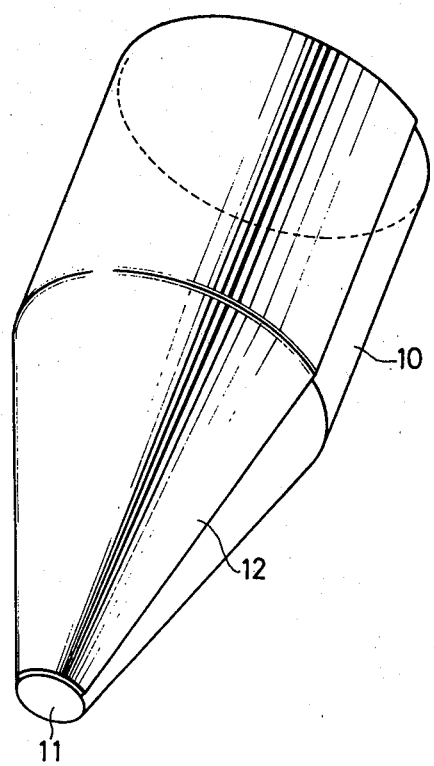
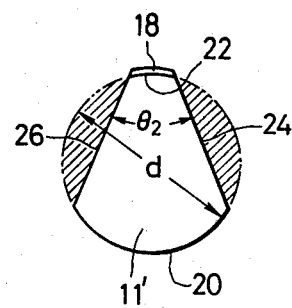
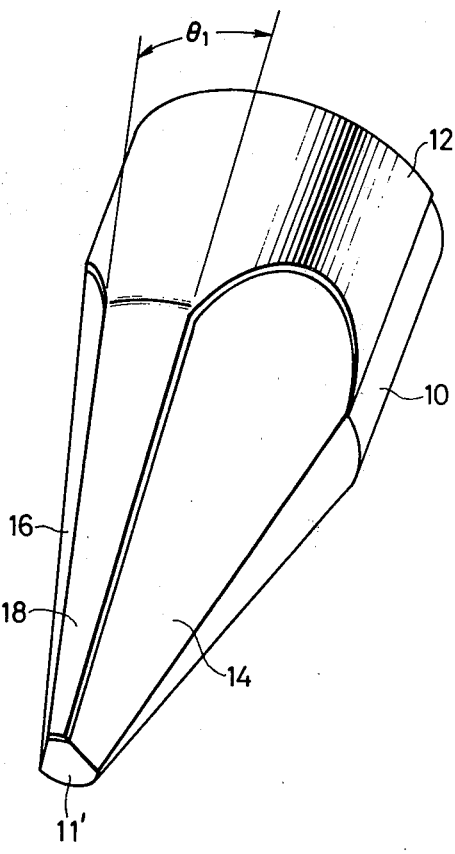
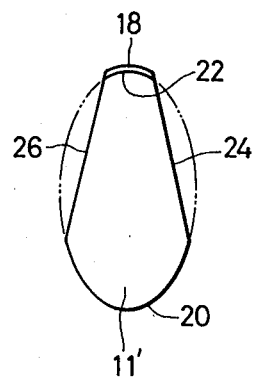

CAPACITANCE DETECTION TYPE STYLUS FOR GROOVELESS DISC RECORDS AND METHOD FOR MAKING SAME

BACKGROUND OF THE INVENTION

The present invention relates to a reproducing stylus of a capacitance detection type for grooveless disc records in which signals are recorded in the form of minute pits and a method for manufacturing the stylus.

Capacitance detection type reproducing stylii are formed with a contact face, structured so that the stylus may rest over several recording tracks. An electrode is provided for reading just one information signal, recorded in a track, and tracking signals which may be recorded on either side thereof or on a common track with the information signal. Since the disc record is spun at a considerably high speed, the reproducing stylus is manufactured to tight tolerances to ensure a reasonable operating lifetime.

Various attempts have hitherto been made to improve life time for such stylii. One prior art attempt involves the use of a multifaced body of a hard, insulative material with the electrode being attached to a rear face of the body. To assure excellent operating performance, the stylus body is ground or abraded with utmost care so that it is structurally balanced with respect to its vertical axis. Furthermore, the adjoining faces of the stylus body must be carefully shaped so that the edges between adjacent faces are free of any chipped portions which might catch dust or small fragmentary objects that would eventually cause impairment of the record surface. Therefore, productivity of this type of stylus is quite low.

Another prior art approach involves the use of a cylindrical stylus body having a conically shaped portion. Although this approach eliminates the precision requirements as imposed on the multifaced type, the electrode must be deposited on a curved surface of the support body using a photoresist and a mask pattern to assure that the electrode has a predetermined width along its length. The latter approach involves various production process steps including exposure to light through the mask pattern, developing the photoresist and etching unnecessary parts of the photoresist. Because of the small dimensions of the stylus, coupled with the fact that it must be passed through a number of process steps, productivity is also not satisfactory.

SUMMARY OF THE INVENTION

Accordingly, an object of the invention is to provide a capacitance detection type stylus which permits high productivity and a method for manufacturing the same.

According to the invention, a capacitance detection type reproducing stylus is fabricated from a body of a hard, insulative material. The transverse cross-section of the insulative body is of a circular or elliptical configuration. A layer of conductive material is attached to the insulative body by vacuum deposition or by a similar manner. The conductive layer, which serves as a stylus electrode, extends the length of the insulative body, but extends partially the circumference of the underlying body. The conical portion of the insulative body with the conductive layer being attached thereto is lapped to remove end portions of the conductive layer and the conical portion so that they are truncated to form a contact face with which the stylus makes contact with disc records, and further lapped to remove side portions of the conductive layer and the underlying body to form a pair of substantially flat surfaces which are at an angle to, and symmetrical with respect to the center axis of, the insulative body. These flat surfaces extend from the contact face of the body toward the opposite end so that the remainder of the conductive layer forms a narrow electrode therebetween. The above process enables the electrode to be manufactured to a tight tolerance, while allowing the stylus to be manufactured at high productivity.

BRIEF DESCRIPTION OF THE DRAWINGS

The invention will now be described with reference to the accompanying drawings, in which:

FIG. 1 is a perspective view of a stylus of the invention prior to a lapping process;

FIG. 2 is a perspective view of the stylus of the invention after the lapping process is completed;

FIG. 3 is a view showing the truncated end of the stylus; and

FIG. 4 is an illustration of a stylus having an elliptical cross-section.

DETAILED DESCRIPTION

Reffering now to the drawings, a preferred embodiment of the invention is illustrated. In FIG. 1, a cylindrical body 10 of a hard, insulative material such as diamond or sapphire is shaped to form a conical portion. To the surface of the body 10 is attached a conductive thin film or electrode 12 having an arcuate extent of a semicircle, for example, and a longitudinal extent from the end of the conical portion to the opposite end of the body 10. The electrode 12 is formed by vacuum deposition or similar known techniques. The conical portion is then truncated by a lapping process to form a contact face 11 of a circular or elliptical shape. Side portions of the body 10 where the electrode 12 is provided are then lapped at an angle to and symmetrically with respect to the center axis of body 10 by a suitable tool to form a pair of flat surfaces 14 and 16 as shown in FIG. 2, leaving a portion of the layer 12 to create an electrode 18. As shown in FIG. 3, the portions of the surface 11 marked by hatched lines are thus removed to form a contact face 11' of a triangular-like shape which is defined by a front curved edge 20 (which corresponds to the leading edge of the contact face 11' with respect to the direction of movement of disc record), a rear curved edge 22 and a pair of angled straight edges 24 and 26 of equal length. The contact face 11' is polished so that the end of the electrode tip 18 shares a common flat plane with the truncated end of the body and its width becomes smaller than the track width and so that the contact face 11' has the width of several tracks to maintain a reduced pressure contact on the record surface when it is brought into contact therewith during operation. A typical width of the electrode tip 18 is 1 micrometer or less and the diameter "d" of the contact face 11' is typically 5 to 10 micrometers. Because of the conical shape, the width of the electrode 18 increases as a function of distance from the constant surface 11'. The hatched portions (FIG. 3) are so removed that the electrode 18 has an angle $\Theta_1$ of 2 to 3 degrees and the straight edges 24 and 26 subtend an angle $\Theta_2$, which is preferably 30 to 90 degrees, at a point adjacent to the rear curved edge 22.

As illustrated in FIG. 4, the stylus body 10 may have an elliptical cross-section. In this case, the maximum distance between front and rear edges 20, 22 is 5 to 10 micrometers.

What is claimed is:

1. A reproducing stylus for grooveless capacitance disc records in which signals are stored in the form of minute pits along a plurality of tracks having particular widths, comprising: a body of hard, insulative material having a truncated, generally conical end portion, said conical end portion having a pair of angled, substantially identical surfaces extending from the truncated end of said conical end portion toward the opposite end of said body in a symmetrical relationship with respect to a plane which includes the center axis of said body and bisects the angle formed between said surfaces, so that said truncated end has an area defined by a front curved edge spanning a plurality of the widths of said tracks and a rear curved edge spanning the width of one of said tracks, and by a pair of angled straight edges each extending between opposite ends of said front and rear curved edges, and an electrode extending from said rear curved edge to the opposite end of said body.

2. A reproducing stylus as claimed in claim 1, wherein said insulative body comprises diamond.

3. A reproducing stylus as claimed in claim 1 or 2, wherein said straight edges subtend an angle of from 30° to 90° at a point adjacent to said rear curved edge.

4. A reproducing stylus as recited in claim 1 wherein said body of hard, insulative material has a curved transverse cross-section.

5. A reproducing stylus as recited in claim 1 wherein said body of hard, insulative material has a conic-section as a transverse cross-section.

6. A reproducing stylus as recited in claim 1 wherein said electrode extending from the rear curved edge to the opposite end of said body is bounded along its length by edges formed at intersections of the electrode with said pair of angled surfaces, said edges including and angle at said rear curved edge, said angle being in the approximate range of 2° to 3°.

7. A reproducing stylus as recited in claim 1 wherein said electrode has a width, at the truncated end of the insulated body, corresponding to the length of said rear curved edge and being substantially narrower than the length of said front curved edge.

8. A reproducing stylus as recited in claim 7 wherein said length of said rear curved edge is approximately one micrometer and the length of said front curved edge corresponds to an arc subtended in a circle of a diameter in the range of five to ten micrometers by an angle in the range of 30°-90° which also subtends an arc forming said rear curved edge.

9. A method for manufacturing a capacitance detection type reproducing stylus for use with a grooveless disc record having a plurality of tracks in which signals are recorded in the form of microscopic pits, comprising the steps of:

(1) providing a body of a hard, insulative material;

(2) forming one end portion of said body into a conical shape;

(3) coating a conductive layer on the surface of said body to cover an area extending from one end of the conical portion to the opposite end of the body, said area having a circumferential extent smaller than the full circumference of said body;

(4) truncating the coated conical portion of said body to form a record contacting face; and (5) removing a pair of substantially identical, spaced apart portions from said coated conical portion of said body to form a pair of angled surfaces of equal area which extend from said record contacting face toward the opposite end in a symmetrical relationship with respect to a plane which bisects the angle of said surfaces and includes the center axis of the body, the portion of said conductive layer which lies between said flat surfaces substantially spanning the width of one of said tracks and forming an electrode and the portion of said truncated end which lies between said flat surfaces opposite to said electrode spanning a plurality of the widths of said tracks.

10. A method as claimed in claim 9, wherein said portions of conductive layer and said conical portion are removed by lapping.

11. A method as claimed in claim 9, wherein said conductive layer is formed by vacuum deposition of a conductive metal.

12. A method as claimed in claim 9 comprising the further step of providing a conic section as the transverse cross-section of said body of hard, insulative material.

* * * * *